June 1, 1943.    W. J. RUSSELL    2,320,951
TOASTER
Filed Dec. 17, 1941

WITNESSES:

INVENTOR
William J. Russell.
BY W. R. Coley.
ATTORNEY

Patented June 1, 1943

2,320,951

UNITED STATES PATENT OFFICE 2,320,951

TOASTER

William J. Russell, Mansfield, Ohio, assignor to Westinghouse Electric & Manufacturing Company, East Pittsburgh, Pa., a corporation of Pennsylvania Application December 17, 1941, Serial No. 423,365

3 Claims. (Cl. 53—5)

My invention relates to vertical toasters and, more particularly, to a dual purpose cover structure therefor.

With vertical toasters known to the art, the upper portion of the toasting ovens are open and exposed. This permits dust and dirt, as well as other foreign or extraneous matter, to fall or pass into the toasting ovens of the toasting structure. This extraneous matter which passes into the toaster tends to contaminate and make the structure generally unclean in time, depending upon the care used in storing the toaster when not in use. To prevent the entrance of contaminating material into the toaster, it is merely necessary to cover the toaster, and numerous cover arrangements have been developed for use on toasters. However, in all cases known to me these covers have been used primarily as covers, and usually have been attached or hinged to the toaster so that they may be used, at times, as a shelf. In addition, there are numerous ingenious serving structures used solely for holding and serving toast. However, there has been no dual purpose cover for a toaster which will, in addition to covering the toaster, constitute means for serving the toast.

It is, therefore, an object of my invention to provide a removable dual purpose cover structure for fitting over the upper portion of a toaster and blocking off or closing the openings into the vertically extending toasting ovens so as to prevent the passage of any foreign or extraneous matter into the ovens, enabling the toaster to be stored and to be maintained in a sanitary condition, and having a portion thereof which will operate to retain slices of toast, enabling the cover to function, when removed from the toaster, as a serving structure.

A further object of my invention is to provide a decorative cover for a toaster which will fit over and enclose the openings entering into the toasting ovens and which has a plurality of depending fingers which will prevent the cover from sliding off the toaster structure.

Another object of my invention is to provide a highly decorative cover for a toaster which will blend into a general configuration of the toaster itself while functioning as a serving tray when removed from the toaster structure.

Still a further object of my invention is to provide a dual purpose structure for a vertical toaster which, when the toaster is not being used, fits over the top thereof as a cover, and which, when the toaster is being used, is operable as a serving tray which supports the toast in a vertical position.

Other objects of my invention will either be pointed out specifically in the course of the following description of a device embodying my invention or will be apparent from such description.

In the accompanying drawing.

Figure 1:
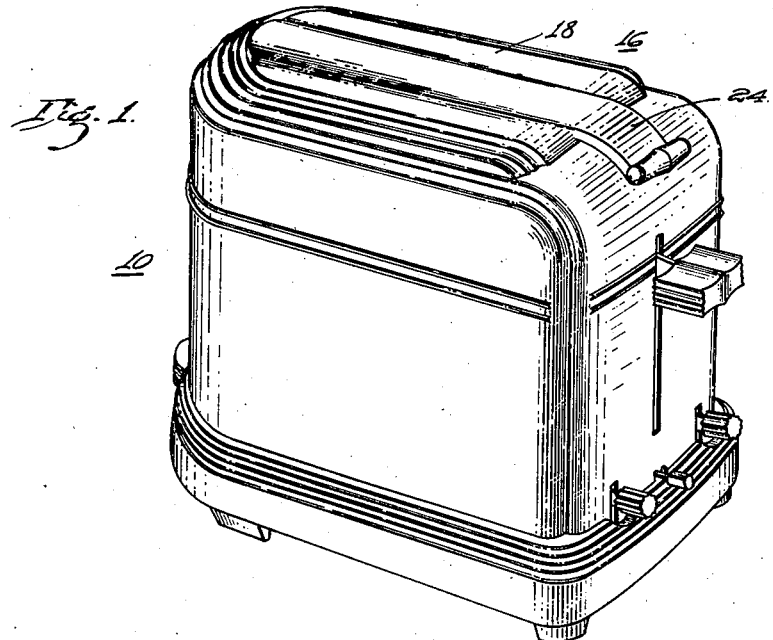
Figure 1 is a perspective view of a toaster utilizing the dual purpose cover and serving structure embodying my invention.

Referring to the accompanying drawing, in which like reference characters indicate like parts in the several figures, I show a conventional type vertical toaster 10 having two ovens 12, suitable heating elements 14 therefor, and a dual purpose cover and serving structure 16 having an upper surface 18, a lower surface 20, a plurality of spaced members or fingers 22 normal thereto and a handlelike portion 24 for handling the structure 16.

The toaster 10 may be of any conventional design having vertically extending ovens 12 which are open at the top. Heat is supplied to the toasting ovens 12 by suitable heating elements 14 which extend vertically to form the side walls 13 of the ovens in keeping with established practice. These walls are provided with the usual stationary wire guides 17. A vertically movable carriage 15 is positioned within each oven 12 for retaining the toast in the oven and for elevating it to a removable position, in accordance with a familiar practice. The ovens, being open at the top, thus permit dust and extraneous or foreign matter to pass downwardly into the ovens and upon the toast retaining carriages so as to contaminate said ovens and carriages, as is well known to any user of this type of toaster.

The cover and serving structure 16 embodying my invention when positioned upon the toaster prevents the passage of said extraneous matter into the toaster. Said structure is, in this instance, an elongated relatively flat member formed preferably of a die-cast plastic material. However, said structure may, if desired, be fabricated from sheet metal, or formed in any other suitable manner. The dual purpose structure 16 is of such configuration as to fit upon the vertical toaster and preferably conform with the overall design thereof. In addition, the upper surface 18 of the structure 16 may have any suitable artistic markings thereon to aid in the decorative treatment of the overall toaster structure.

The lower surface 20 of the structure 16 is slightly dished upwardly and has, in this instance, two rows of spaced finger-like members 22 depending normally therefrom. The rows of fingers 22 are transversely spaced with respect to each other so as to fit downwardly into the upper portion of each of the ovens 12 when the cover is positioned upon the top of the toaster structure 10. These fingers 22, by fitting into the ovens 12, thus prevent the dual purpose cover structure from being accidentally knocked from the top of the toaster or from sliding off of the toaster as it is moved by the operator.

Figure 4:
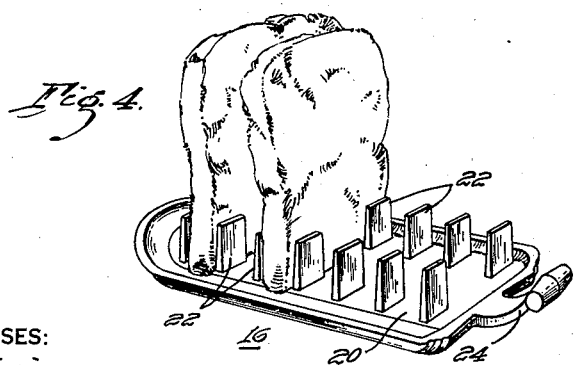
Fig. 4 is a perspective view of the dual purpose cover and serving structure embodying my invention functioning as a serving member and supporting pieces of toast.

In addition, the fingers 22 aid in retaining slices of toast when the cover structure 16 is removed from the toaster and used as a tray. The fingers 22 are preferably spaced longitudinally apart from each other a distance just sufficient to permit a standard slice of bread to fit therebetween. In addition, the fingers are of such length that they will support such a piece of toasted bread and prevent such toast from falling over when the structure is used as a serving tray (see Fig. 4). The surface 20 of the structure 16 being slightly dished then serves as a crumb tray, so as to collect or catch crumbs which may fall off the toast being conveyed by the structure 16.

Figure 2:
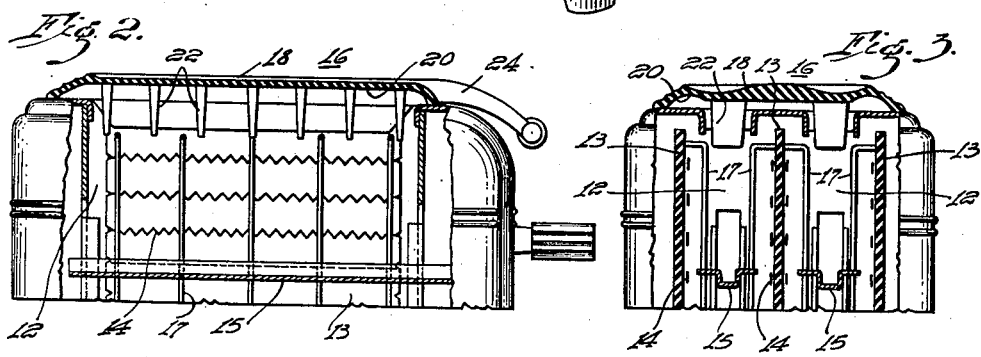
Fig. 2 is a partial side and fragmentary sectional view of the structure shown in Fig. 1.
Figure 3:
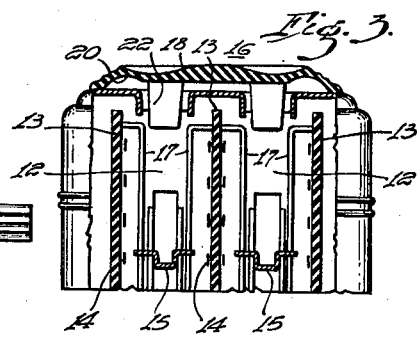
Fig. 3 is a partial end and fragmentary sectional view of the structure shown in Fig. 1.

A longitudinally and outwardly extending handlelike portion 24 is formed integrally with the structure 16, preferably extending from the middle portion of one end of the structure, and is slightly bowed downwardly with respect to the structure 16 when said structure is functioning as a cover. This enables the portion 24 to fit relatively closely to the upper portion of the toaster (see Figs. 1 and 2), thus precluding said cover from being accidentally knocked therefrom. In addition, said handlelike portion 24 will thus be curved upwardly (see Fig. 4) when the structure 16 is functioning as a serving tray. This upward curvature of the portion 24 thus provides a readily graspable handle enabling an operator to conveniently manipulate the structure 16 so as to serve the toast supported thereby.

When it is desired to remove the dual purpose cover structure from the toaster, it is merely necessary to grasp the handle portion 24 and lift the cover structure upwards. To use said structure as a serving tray, it is then merely necessary to invert the structure whereupon the fingers 22 will extend upwardly and the upper surface of the structure will be slightly dished. Said structure is thus capable of receiving a plurality of pieces of toast and of being used as a serving tray.

It will be seen, therefore, that I have provided a dual purpose cover and serving structure which, in addition to fitting over and closing the openings into the ovens of vertical toasters, for dust-proofing purposes, functions as a serving tray by retaining slices of toast in a vertical position, enabling an operator to carry the toast and serve the same.

Various modifications may be made in the device embodying my invention without departing from the spirit and scope thereof, and I desire, therefore, that only such limitations be placed thereon as are imposed by the prior art and the appended claims.

I claim as my invention:

1. A cover structure for a toaster having a vertically positioned toasting chamber with an open top, said cover embodying an under surface for fitting over the top surface of the toaster, and a plurality of downwardly extending finger-like members which fit into the chamber for preventing the accidental removal of the cover when said cover is positioned on top of the toaster and for holding slices of toast when said cover is in an inverted serving position.

2. A cover for a toaster having a vertically extending oven, having a plurality of substantially parallel elongated openings at the top, comprising an elongated relatively flat structure for fitting over the toaster and into the oven, means for bodily removing the cover from the toaster, and an equal plurality of rows of members extending at substantially right angles to the cover within the respective openings to position said cover, said means also serving, when said cover is removed by said means from the toaster and inverted for receiving and supporting pieces of toast, as a tray-handle whereby said cover may be used to serve toast.

3. A cover structure for a toaster having a plurality of vertically positioned toasting chambers with substantially parallel longitudinally extending openings at the top, said cover embodying an under surface for fitting over the top surface of the toaster, and an equal plurality of longitudinally extending rows of finger-like members extending at substantially right angles to the cover within the respective openings to position the cover, said members being alined laterally to serve when said cover is removed from the toaster and inverted in both longitudinally and laterally extending groups for receiving and supporting pieces of toast.

WILLIAM J. RUSSELL.